United States Patent
Pallardy et al.

(10) Patent No.: US 12,455,692 B2
(45) Date of Patent: Oct. 28, 2025

(54) MANAGEMENT OF A MEMORY FIREWALL IN A SYSTEM ON CHIP

(71) Applicants: STMicroelectronics (Grand Ouest) SAS, Le Mans (FR); STMicroelectronics (Alps) SAS, Grenoble (FR)

(72) Inventors: Loic Pallardy, Rouillon (FR); Nicolas Anquet, Grenoble (FR)

(73) Assignees: STMicroelectronics (Alps) SAS, Grenoble (FR); STMicroelectronics (Grand Ouest) SAS, Le Mans (FR)

( * ) Notice: Subject to any disclaimer, the term of this patent is extended or adjusted under 35 U.S.C. 154(b) by 237 days.

(21) Appl. No.: 17/993,618

(22) Filed: Nov. 23, 2022

(65) Prior Publication Data
US 2023/0161485 A1  May 25, 2023

(30) Foreign Application Priority Data
Nov. 25, 2021 (FR) ........................ 2112501

(51) Int. Cl.
*G06F 3/06* (2006.01)
*G06F 12/14* (2006.01)

(52) U.S. Cl.
CPC .......... *G06F 3/0622* (2013.01); *G06F 3/0637* (2013.01); *G06F 3/0673* (2013.01); *G06F 12/1441* (2013.01); *G06F 12/1458* (2013.01)

(58) Field of Classification Search
CPC .... G06F 3/0622; G06F 3/0637; G06F 3/0673; G06F 12/1441; G06F 12/1458
(Continued)

(56) References Cited

U.S. PATENT DOCUMENTS

| 7,278,030 B1 * | 10/2007 | Chen ................ G06F 12/1466 |
| | | 711/201 |
| 11,876,732 B2 * | 1/2024 | Olson ................ H04L 49/109 |

(Continued)

FOREIGN PATENT DOCUMENTS

| CN | 109886035 A | 6/2019 |
| CN | 112835846 A | 5/2021 |
| FR | 3103586 A1 | 5/2021 |

OTHER PUBLICATIONS

Machine translation of CN 109886035 (Year: 2019).*
(Continued)

*Primary Examiner* — Reginald G Bragdon
*Assistant Examiner* — Aaron D Ho
(74) *Attorney, Agent, or Firm* — Slater Matsil, LLP

(57) ABSTRACT

In accordance with an embodiment, a system on chip includes: a plurality of master equipment; a plurality of slave resources, where a slave resource of the plurality of slave resources comprises a memory device includes a first memory area; an interconnection circuit; and a check circuit. A first master equipment is configured to define initial access rights for the first memory area, and to delegate access management of the first memory area to a second master equipment. The second master equipment is configured to define for the first memory area, particular access rights from the initial access rights associated with the first memory area and access right rules; and the check circuit is configured to check whether a transaction intended for the first memory area is indeed authorized to access the first memory area using applicable access rights associated with the first memory area.

20 Claims, 5 Drawing Sheets

(58) Field of Classification Search
USPC .......................................................... 711/163
See application file for complete search history.

(56) References Cited

U.S. PATENT DOCUMENTS

| | | | | |
|---|---|---|---|---|
| 2002/0078004 | A1* | 6/2002 | Ambrosini | H04L 63/105 |
| 2004/0039909 | A1* | 2/2004 | Cheng | G07C 9/22 |
| | | | | 713/169 |
| 2005/0114555 | A1* | 5/2005 | Errickson | G06F 12/1475 |
| | | | | 711/E12.095 |
| 2007/0233957 | A1* | 10/2007 | Lev-Ran | H04L 63/10 |
| | | | | 711/118 |
| 2012/0079590 | A1* | 3/2012 | Sastry | G06F 12/1458 |
| | | | | 726/21 |
| 2012/0239895 | A1* | 9/2012 | Zbiciak | G06F 12/1458 |
| | | | | 711/E12.091 |
| 2012/0272027 | A1 | 10/2012 | Zbiciak | |
| 2015/0269396 | A1 | 9/2015 | Grafton | |
| 2017/0115911 | A1* | 4/2017 | Kirshenbaum | G06F 3/0659 |
| 2017/0185344 | A1* | 6/2017 | Kirshenbaum | G06F 21/6218 |
| 2018/0157603 | A1 | 6/2018 | Schulz et al. | |
| 2018/0204024 | A1* | 7/2018 | Lillibridge | G06F 3/0659 |
| 2019/0332287 | A1* | 10/2019 | Sun | G06F 3/0689 |
| 2020/0036587 | A1* | 1/2020 | Cilfone | H04L 41/0856 |
| 2021/0160134 | A1 | 5/2021 | Anquet et al. | |
| 2021/0160193 | A1* | 5/2021 | Olson | G06F 21/85 |

OTHER PUBLICATIONS

Gerstlauer, A., "EE382V System-on-a-Chip (SoC) Design," Lecture 12—SoC Communication Architectures, University of Texas at Austin, Oct. 17, 2014, 43 pages.

Venkateswara Rao, M., et al., "A Frame work on AMBA bus based Communication Architecture to improve the Real Time Computing Performance in MPSoC," International Journal of Computer Applications (0975-8887), vol. 91, No. 5, Apr. 2014, 5 pages.

* cited by examiner

FIG. 7
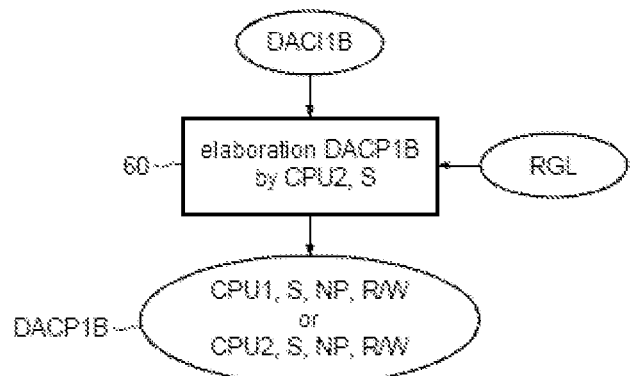
FIG. 8
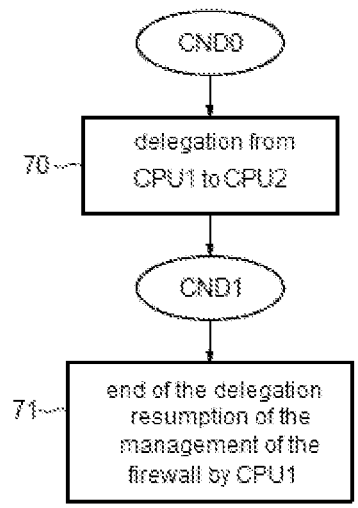
FIG. 9

MANAGEMENT OF A MEMORY FIREWALL IN A SYSTEM ON CHIP

CROSS-REFERENCE TO RELATED APPLICATIONS

This application claims the benefit of French Patent Application No. 2112501, filed on Nov. 25, 2021, which application is hereby incorporated herein by reference.

TECHNICAL FIELD

Implementations and embodiments relate to integrated circuits, in particular to the management of a memory firewall in a system on chip (SoC).

BACKGROUND

In order to help ensure the reliability of a system on chip, it may be necessary to restrict the access of one or more master equipment to specific slave resources. Such a feature is designated by the person skilled in the art by the term "firewall or isolation".

It is also possible to make a management of these access restrictions which is simple to carry out and to implement, particularly in the case where this management is dynamic, for example when it depends on the applications considered for the system on chip, for example applications considered on the multiple cores of the chip.

It is still possible to propose a system on chip, for example a microcontroller or a microprocessor, allowing all cases of use from the various users of the system on chip as well as all configurations in a flexible manner, and including in particular a low power mode.

The French patent application published under No. 3103586 (hereinafter, "French Patent Application"), also published as U.S. Patent Publication No. 2021/01610134, both of which have been incorporated herein by reference, describes an example of a system on chip having the advantages mentioned above.

However, there is still a need to improve such a system on chip, in particular with regard to the management of the accesses to a memory and the management of the configuration of firewall thereof, in particular when this memory is partitioned into several memory areas.

More generally, there is a need to simplify the configuration of the firewall of a memory, internal to a system on chip or external but coupled to the system on chip, in particular when modifying the access rights to a portion of the memory, or else when the system on chip is in a low power mode.

SUMMARY

In accordance with an embodiment, a system on chip includes: a plurality of master equipment; a plurality of slave resources, where at least one slave resource of the plurality of slave resources comprises a memory device including a first memory area; an interconnection circuit coupled between the plurality of master equipment and the plurality of slave resources, the interconnection circuit configured to route transactions between the plurality of master equipment and the plurality of slave resources; and a check circuit. A first master equipment of the plurality of master equipment is configured to define initial access rights for the first memory area, and to delegate access management of the first memory area to a second master equipment of the plurality of master equipment; the second master equipment is configured to define for the first memory area, particular access rights from the initial access rights associated with the first memory area and access right rules; and the check circuit is configured to check whether a transaction intended for the first memory area is indeed authorized to access the first memory area using applicable access rights associated with the first memory area. The applicable access rights include the initial access rights, the particular access rights, or other access rights, and the applicable access rights apply when the transaction is received.

In accordance with another embodiment, a method for managing memory access for a system on chip that includes a plurality of master equipment, a plurality of slave resources, an interconnection circuit coupled between the plurality of master equipment and the plurality of slave resources configured to route transactions between the plurality of master equipment and the plurality of slave resources, where at least one slave resource of the plurality of slave resources comprises a memory device including a first memory area, includes: defining, by a first master equipment of the plurality of master equipment, initial access rights for the first memory area; delegating, by the first master equipment, the access management of the first memory area to a second master equipment of the plurality of master equipment; defining, by the second master equipment for the first memory area, particular access rights from the initial access rights associated with the first memory area and access right rules; and checking whether a transaction intended for the first memory area is indeed authorized to access this first memory area using applicable access rights associated with the memory area. The applicable access rights include the initial access rights, the particular access rights, or other access rights, and the applicable access rights apply when the transaction is received.

In accordance with a further embodiment, a method of operating a firewall, the method includes: receiving, from a first master equipment of a plurality of master equipment, initial access rights for a first memory area of a slave device; receiving, from the first master equipment, a command to delegate access management of the first memory area to a second master equipment of the plurality of master equipment; receiving, from the second master equipment, a command to define particular access rights from the initial access rights associated with the first memory area and access right rules for the first memory, and checking whether a transaction intended for the first memory area is indeed authorized to access this first memory area using applicable access rights associated with the memory area. The applicable access rights include the initial access rights, the particular access rights, or other access rights, and the applicable access rights apply when the transaction is received.

BRIEF DESCRIPTION OF THE DRAWINGS

Other advantages and features of the invention will appear on examining the detailed description of embodiments and implementations, without limitation, and of the appended drawings in which:

FIGS. 6 and 7 illustrate a diagrams showing elaborations of particular access rights according to embodiments;

FIG. 8 illustrates a table of example access right rules according to an embodiment;

FIG. 9 illustrates a diagram depicting the delegation of access right management according to an embodiment;

DETAILED DESCRIPTION OF ILLUSTRATIVE EMBODIMENTS

Figure 1:
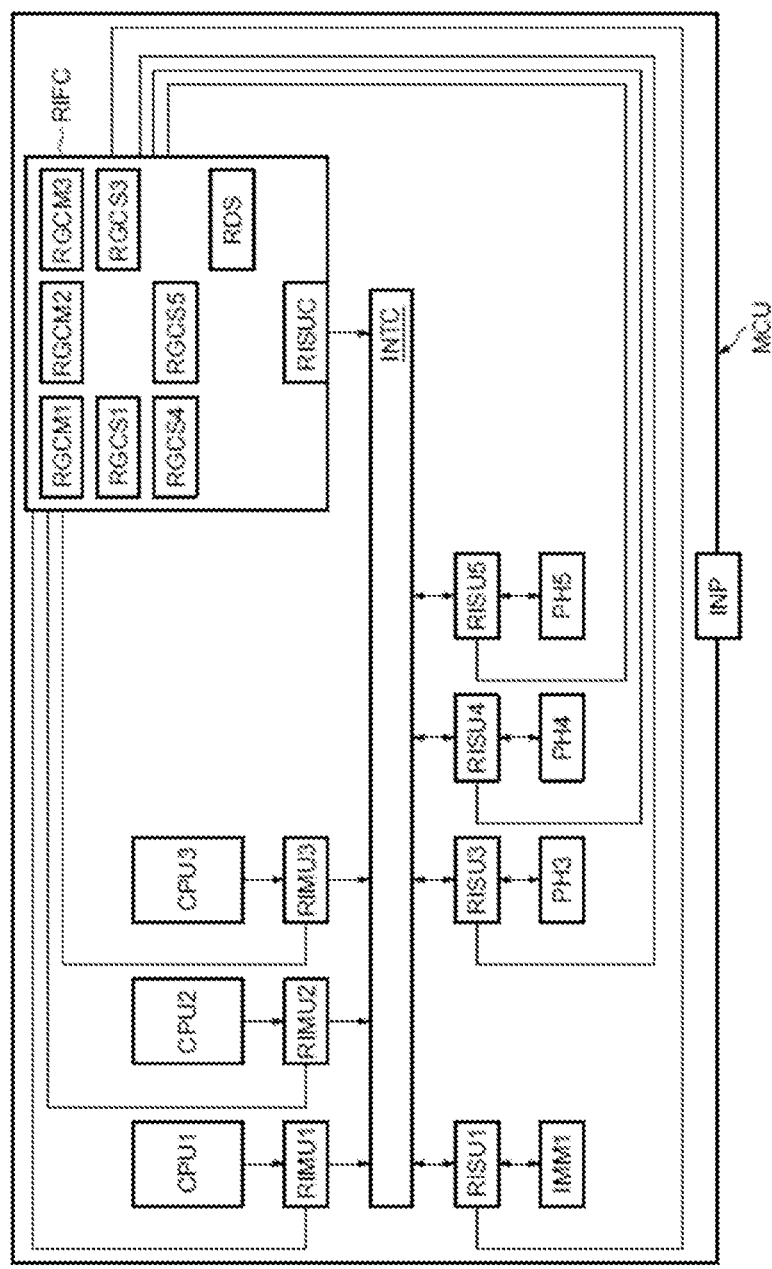
FIG. 1 illustrates a block diagram of an embodiment system on chip.

Implementations and embodiments relate to integrated circuits, in particular systems on chip (SoC), for example a microcontroller (multi-core or single-core), or a microprocessor, for example the management of the operation of such a system on chip and more particularly the management of the accesses to a memory partitioned into several memory areas and the management of the configuration of the firewall of such a memory.

According to one aspect, a system on chip is proposed comprising several master equipment, for example, when the system forms in particular a microcontroller, at least one microprocessor and generally several microprocessors, a direct memory access (DMA) controller without these examples being limiting. The system on chip further includes several slave resources.

By way of non-limiting example, a slave resource can belong to the group formed by at least one peripheral, for example a peripheral of the I²C ("Inter Integrated Circuit") type, of the SPI ("Serial Peripheral Interface") type, of the UART ("Universal Asynchronous Receiver Transmitter") type, or else a real time clock (RTC), a feature of a peripheral, for example an alarm line of the RTC peripheral.

The system on chip also includes at least one slave resource containing a memory device including at least one first memory area.

The term "memory device" has very broad meaning encompassing, for example, memory circuits internal to the system on chip, or a memory interface internal to the system on chip and intended to be coupled to memory circuits external to the system on chip, for example a memory of the DDR SRAM ("Double Data Rate Synchronous Dynamic Random Access Memory") type.

The system on chip further includes an interconnection system (known by the person skilled in the art under the name "interconnect") coupled between the master equipment and the slave resources and capable of routing transactions (for example write or read transactions) between the master equipment and the slave resources.

Among the master equipment, a first master equipment, for example but without limitation, a microprocessor, is configured to define (for example during the execution of a user program after a cold boot phase) initial access rights for this first memory area, and to delegate, at least temporarily, the management of the accesses of said at least one first memory area to a second master equipment.

This second master equipment, preferably different from the first master equipment, is configured to define, for said at least one first memory area, particular access rights from the initial access rights associated with this first memory area and access right rules. These access right rules can be software incorporated into the program executed by the second master equipment and can also be hard-coded.

The system further includes at least one check circuit (acting as a firewall) configured to check whether a transaction intended for said at least one first memory area is indeed authorized to access this first memory area by using access rights associated with this memory area and applicable when said transaction is received. The access rights called applicable access rights include the initial access rights or the particular access rights, or other access rights.

Indeed, as will be seen in more detail below, it is possible for the second master equipment to assign particular access rights for the entire first memory area.

However, according to one possible embodiment, at least one first memory area can be partitioned into several memory sub-areas and the second master equipment which has obtained delegation for this first memory area is configured to allocate respective access rights for these memory sub-areas.

Thus, these memory sub-areas can be disjoint, adjoining or not, or even overlapping.

The access rights to memory sub-areas can be particular access rights while a memory sub-area located between two memory sub-areas assigned specific access rights, can for example retain its initial access rights that had been defined by the first master equipment.

Similarly, since the delegation may be temporary, it is possible, as will be seen below, for the first master equipment to withdraw this delegation and regain control of the management of the access rights of this first memory area. In this case, the first master equipment can retain the initial access rights or else define other access rights, different from the initial and particular access rights.

Similarly, it is possible to activate or not the firewall, temporarily for example.

Thus, if the firewall is not activated, there is no filter on the access rights and any transaction, emanating from any master equipment, can then for example access the first memory area.

Delegating the management of the firewall and therefore the management of the access rights to a second master equipment, in particular allows for easily changing the access rights to a memory area within the context of task scheduling, easily sharing a buffer memory with another execution memory region, or even being compatible with a low power operating mode in which the first master equipment would be on standby and where it would nevertheless be necessary to locally manage memory accesses to a memory. Thus, it is possible, subject for example to compliance with rules, to override certain parameters of the firewall which had been programmed on initialization by the first master equipment, without the need to go through the first master equipment. In other words, unlike systems on a chip of the prior art, it is possible to authorize a local firewall control of a memory or a memory area by the "owner" of the memory itself, that is to say the one which will in particular use this memory, in this case the second master equipment.

The memory device can include several first memory areas and the first master equipment can be configured to define initial access rights for each first memory area, and to delegate respectively, at least temporarily, the management of the accesses of the first memory areas to several second master equipment, different or not.

As previously indicated, the first master equipment can further be configured to, after having delegated the management of the accesses of a first memory area to the corresponding second master equipment, withdraw this delegation and resume the management of the accesses to this first memory area, or possibly re-delegate to another second master equipment. The first master equipment can also be configured to, after having withdrawn a delegation, not be authorized to grant a new delegation for the management of the accesses to the concerned first memory area.

According to one embodiment, the memory device can include at least one second memory area and the first master equipment can also be configured to define initial access rights for this second memory area and to not be authorized to delegate the management of the accesses to this or these second memory areas. The different memory areas can be regions defined by a start memory address and an end memory address, and the different memory areas can also be memory pages.

According to another aspect, there is proposed a method for managing the accesses to at least one memory device of a system on chip, the system on chip comprising several master equipment, several slave resources, and an interconnection circuit coupled between the master equipment and the slave resources and capable of routing transactions between master equipment and slave resources, at least one slave resource containing said at least one memory device including at least one first memory area, the method comprising: defining, by a first master equipment, initial access rights for this first memory area, delegating, at least temporarily, by the first master equipment, the management of the accesses of said at least one first memory area to a second master equipment, defining, by this second master equipment for said at least one first memory area, particular access rights from the initial access rights associated with this first memory area and access right rules, and checking whether a transaction intended for said at least one first memory area, is indeed authorized to access this first memory area by using access rights associated with this memory area and applicable when said transaction is received, the applicable access rights including the initial access rights or the particular access rights, or other access rights.

According to one implementation in which the memory device includes several first memory areas, a method includes: defining, by the first master equipment, initial access rights for each first memory area, and delegating, by the first master equipment respectively, at least temporarily, the management of the accesses of the first memory areas to several second master equipment.

According to one implementation in which the corresponding first memory area includes several first memory sub-areas, and the method further includes managing, by each second master equipment, the accesses of these first memory sub-areas.

According to one implementation, the method further includes withdrawing, by a first master equipment, after it has delegated the management of the accesses of a first memory area to the corresponding second master equipment, this delegation and resuming by the first master equipment, the management of the accesses to this first memory area.

According to one implementation in which the memory device includes at least one second memory area, and the method further includes defining, by the first master equipment, initial access rights for this second memory area and not authorizing the first master equipment to delegate the management of the accesses to this or these second memory areas.

The system on chip can form a microcontroller or a microprocessor.

Embodiments of the present invention may apply to any type of system on chip comprising several master equipment, several slave resources, and an interconnection circuit coupled between the master equipment and the slave resources and capable of routing transactions between master equipment and resources slaves.

Embodiments of the invention apply in particular to a system on a chip such as that described in the French Patent Application No. 3103586 mentioned above, including certain general characteristics, relating in particular to the configuration diagram, the identification of the master equipment and the slave resources, as well as the transaction structure, will be covered below.

However, the person skilled in the art may refer, for all practical purposes, to this French Patent Application, the content of which is incorporated, by reference, to this patent application.

In FIG. 1, the reference MCU designates a system on chip forming herein a microcontroller, although this example is not limiting.

The system on chip MCU includes herein several master equipment of which only three referenced CPU1, CPU2, CPU3 are represented herein for the purpose of simplification.

In this example, the master equipment CPU1, CPU2 and CPU3 are microprocessors and the other master equipment can be, for example, master equipment of the direct memory access (DMA) type or else, for example, USB controllers or even a master equipment of the PCI express type, without this list of examples being exhaustive. In some embodiments, the components on the system on chip may be implemented on a single integrated circuit, such as single, monolithic integrated circuit. The integrated circuit may be implemented on a semiconductor substrate, such as a silicon substrate.

The system on chip MCU also includes several slave resources of which only four, referenced IMM1, PH3, PH4, PH5, are represented herein for the purpose of simplification.

In general, a slave resource belongs to the group formed at least by a peripheral, a feature of a peripheral, a memory circuit internal to the system on chip MCU, a memory interface internal to the system on chip and intended to be coupled to at least one memory circuit external to the system on chip. Thus, in the illustrated example, the slave resource IMM1 is a memory device, and more particularly a memory internal to the system on chip.

The slave resources PH3, PH4 and PH5 are peripherals, for example a peripheral of the UART type, an I²C controller, an SPI controller.

The structure of the master equipment and of the slave resources may be conventional and known per se.

The system on chip MCU also includes an interconnection circuit INTC capable of routing transactions between master equipment and slave resources.

The structure of such an interconnection circuit, which is generally a multilayer interconnection circuit, as well as the protocol allowing the exchange and the routing of the transactions inside the interconnection circuit are well known to the person skilled in the art. This might, for example, refer in particular: to the article by Venkateswara Rao and others entitled "A Frame work on AMBA bus based Communication Architecture to improve the Real Time Computing Performance in MPSoC", International Journal of Computer Applications (0975-8887), Volume 91—No 5, April 2014; or to a general presentation of these interconnection circuits performed in 2015 by A. Gerstlauer and available at the internet address http://users.ece.utexas.edu/~gerstl/ee382v_f14/lectures/lecture_12.pdf.

Moreover, by way of indication but not limitation, the interconnection circuit marketed by the company ARM under the reference NIC-400 (version Rop3) can be used for example.

The system on chip also includes, associated with each master equipment and with each slave resource, a set of configuration registers including several configuration registers intended to respectively store configuration information, the meaning of which will be reviewed to in more detail below.

The reference RGCM1 designates the set of configuration registers associated with the master equipment CPU1; the reference RGCM2 designates the set of configuration registers associated with the master equipment CPU2; the reference RGCM3 designates the set of configuration registers assigned to the master equipment CPU3; the reference RGCS1 designates the set of configuration registers assigned to the slave resource IMM1; the reference RGSC3 designates the set of configuration registers associated with the peripheral PH3; the reference RGCS4 designates the set of configuration registers assigned to the peripheral PH4; and the reference RGCS5 designates the set of configuration registers assigned to the peripheral PH5.

Moreover, in this example, a register RDS, called designation register, is provided, the feature of which will be reviewed in more detail, but which can already be indicated as being used to designate a master equipment, as a first master equipment, having the quality of manager master equipment.

The different sets of configuration registers are represented herein within a controller RIFC; however, they could be disposed outside the controller.

The system on chip MCU also includes, associated with each master equipment, an elementary management unit RIMU1, RIMU2, RIMU3.

The structure and feature of these elementary management units will be reviewed in more detail, but it might already be said that they are part of the additional circuits and systems intended to add, to any transaction sent by a master equipment, identification information CID and possibly security information and/or privilege information.

The system on chip also includes, associated with each slave resource, an elementary check module RISU1, RISU3, RISU4, RISU5, the structure and feature of which will also be reviewed to in more detail below.

It might already be said that these elementary check modules are part of the check circuit intended to check whether a transaction intended for a slave resource is indeed authorized to access this slave resource.

The different elementary management units RIMU and the different elementary check modules RISU are respectively connected to the corresponding sets of configuration registers by specific links, for example metal tracks.

While the elementary verification modules RISUi have been represented in FIG. 1 outside the corresponding peripherals, it is quite possible to provide one or more peripherals having their corresponding elementary check module, integrated into the peripheral itself.

As will be seen in more detail below, the module RISU1 and the associated registers RGCS1 act as a firewall for the memory IMM1, the management of this firewall initially assigned to the first master equipment or manager equipment, which may under certain conditions, be delegated, at least temporarily, for certain memory areas of the memory IMM1, to a second master equipment.

But before detailing this, some features and characteristics of the system on chip are briefly recalled herein. The person skilled in the art might possibly refer to the aforementioned French Patent Application for more details. Other features and characteristics of the system on chip, not necessary for the implementation of the invention, such as for example the possibility of changing manager equipment, described in the aforementioned French Patent Application and which can nevertheless be implemented in the present system on chip, will not be described here for the purpose of simplification.

The system on chip MCU includes processors, distributed in particular within the different elements which have been described with reference to FIG. 1, and configured to allow a user of the system on chip to implement within the system on chip, during a configuration phase, a configuration diagram which is defined by the set of configuration information which will be stored in the different sets of configuration registers.

Before reviewing in more detail on the constitution of this configuration information, it might already be noted that the user has the option of implementing a static or dynamic configuration. It is assumed herein by way of example that the configuration diagram corresponds to an initial diagram remaining valid during the use or operating phase of the system on chip (static configuration).

More specifically, by way of example, the first manager master equipment is configured to, in response to a first boot or cold boot of the system on chip, perform a boot phase at the end of which this first manager master equipment is configured to at least allow the implementation of the initial configuration diagram.

The designation of the first manager master equipment can be set during the production of the system on chip MCU, for example by a hard-coding. Alternatively, it is possible for the user to use the programmable designation register RDS allowing designating the first manager master equipment.

By way of example, a boot memory ("boot ROM") is configured to store a boot program executable only by the first manager master equipment, for example the microprocessor CPU1, during the first boot or the cold boot of the system on chip.

An input INP (FIG. 1) can be configured to receive a user program. This user program can for example be stored on an SD card cooperating with said input INP. This user program is received from the input INP and stored in a program memory. This user program contains at least instructions representative of the initial configuration diagram.

In this example, the first manager master equipment (for example the microprocessor CPU1) is configured to, at the end of its boot phase, execute the user program in order to implement the initial configuration diagram.

While a microprocessor has been described herein as the first manager master equipment, for example the microprocessor CPU1, it is entirely possible alternatively that the first manager master equipment comprises a hardware logic circuit.

Figure 2:
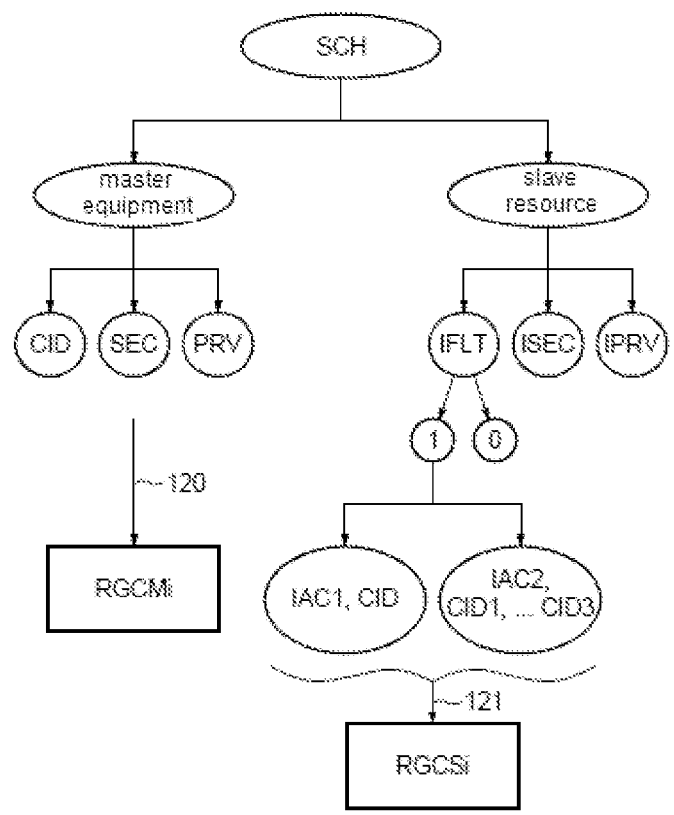
FIG. 2 illustrates a diagram of an embodiment set of configuration information.

Reference is now made more particularly to FIG. 2 in order to illustrate an example of a set of configuration information defining a configuration diagram SCH, which may be the initial diagram or else a modified initial configuration diagram.

For the sake of simplification, only a few configuration information is mentioned herein, among those mentioned in the aforementioned French Patent Application.

The set of configuration information can thus include, for each master equipment, identification information CID. This identification information allows identifying the master equipment from the list of the master equipment. This identification information CID can for example be a digital word.

The set of configuration information of a master equipment can also include security information SEC, for example a bit, indicating, according to the logical value of the bit, whether this master equipment is configured in secure or non-secure mode. The set of configuration information for a master equipment can also include privilege information PRV, for example a bit, indicating according to the logical value of the bit whether this master equipment is configured in privileged or non-privileged mode. This privilege information can include several bits if several levels of privileged modes are provided.

This configuration information associated with the master equipment is stored (step 120) in the corresponding configuration register set RGCMi.

With regard to a slave resource, the set of configuration information associated therewith may comprise, for example for a non-accessible slave resource, filtering information IFLT, for example a bit, intended to indicate, based solely on the identification information CID of the master equipment, whether this slave resource can be accessed by any master equipment or by only one or more master equipment.

Thus, for example, if the filtering information has the logical value "0", this means that there is no filtering applied to the identification information and that consequently a slave resource can be accessed by any master equipment.

It should be noted that several master equipment can have the same identification information CID. This is the case for example when this master equipment includes a microprocessor and one or more master equipment controllable by this microprocessor. In this case, a compartment designated by the identification information CID is then formed. All master equipment of this compartment can then for example have access to the same memory resources.

It is also possible that a master equipment controlled by a microprocessor, for security reasons, does not have the same identification information as the microprocessor. This is the case, for example, for PCI-E type equipment. In this case, this allows limiting the access to certain memory resources of this PCI-E type master equipment.

The set of configuration information defining the configuration diagram can further comprise, for the inaccessible slave resource, a first access information IAC1 intended to indicate, in the case where the filtering information IFLT (IFLT=1 by example) indicates that the considered slave resource can be accessed by only one or more master equipment, that this slave resource can be accessed by one or more master equipment having the same identification information CID. In this case of course, the set of configuration information includes this corresponding identification information CID.

As indicated above, this identification information CID can relate to a single master equipment or to several master equipment in the same compartment.

The set of configuration information defining the configuration diagram SCH may further comprise for this inaccessible slave resource, a second access information IAC2 intended to indicate, in the case where the filtering information IFLT (IFLT=1) indicates that the slave resource can be accessed by only one or more master equipment, that this slave resource can be accessed by master equipment having different identification information CID. And, in this case, the configuration information set of this slave resource includes the list CID1 ... CID4, for example, identification information of the corresponding master equipment. Such a slave resource which can be accessed by several master equipment sequentially or simultaneously, can for example be memory one or more memory circuits.

The set of configuration information defining the configuration diagram SCH for this slave resource can also comprise security information ISEC, for example a bit, intended to indicate whether this slave resource is accessible by a secure or non-secure master equipment.

Similarly, the set of configuration information may include privilege information for this slave resource, for example a bit, IPRV, intended to indicate whether this slave resource is accessible by a master equipment in privileged on non-privileged mode.

All this configuration information assigned to a slave resource is stored (step 121) in the corresponding set of configuration registers RGCSi.

It should be noted herein that the first manager master equipment, for example the microprocessor CPU1, is configured to be in secure mode and in privilege mode at the end of its boot phase.

Figure 3:
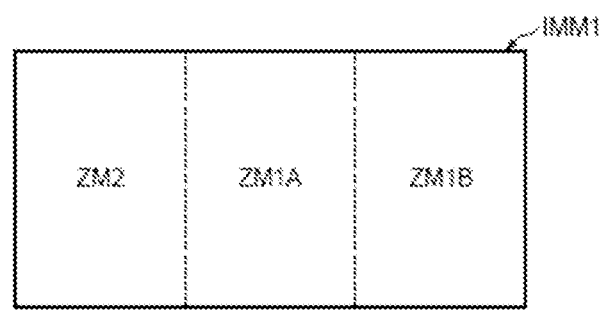
FIG. 3 illustrates a diagram of an embodiment memory partition.

Reference is now made more particularly to FIG. 3 and following to describe in more detail the characteristics and features relating to the management of the access rights of the memory IMM1 as well as the characteristics and the management of the firewall RISU1 thereof. As illustrated in FIG. 3, the memory IMM1 is partitioned herein into three memory areas, namely two first memory areas ZM1A and ZM1B and a second memory area ZM2. Each of these memory areas can be defined by a start address and an end address. Alternatively, in particular when the memory IMM1 is an internal memory, these memory areas can be defined by one or more memory pages.

In the configuration diagram, the first master equipment CPU1 defines (step 40) initial access rights DACI for each of the memory areas ZM1A, ZM1B and ZM2.

Figure 5:
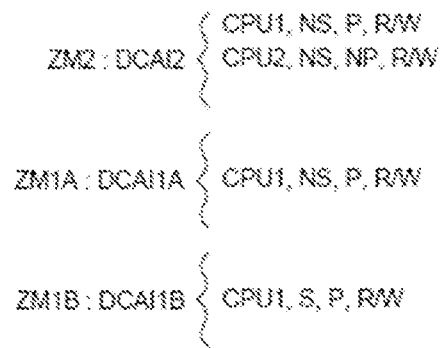
FIG. 5 illustrates example initial access rights according to an embodiment.

Examples of initial access rights are illustrated in FIG. 5. More specifically, for the second memory area ZM2, the initial access rights DCAI2 specify that the memory area can be accessed by the first master equipment CPU1 configured in non-secure mode (NS), in privileged mode (P) and that this access can be a read/write access (R/W). The initial access rights DCAI2 also provide that the second memory area ZM2 can be addressed by the master equipment CPU2 configured in non-secure mode, in non-privileged mode and with a read/write access (R/W).

With regard to the first memory area ZM1A, the initial access rights DCAI1A provide that this first memory area can be accessed by the master equipment CPU1 configured in non-secure mode and in privileged mode with a read/write access (R/W). With regard to the other first memory area ZM1B, the initial access rights DCAI1B provide that this other first memory area can be accessed by the master equipment CPU1 configured in secure mode and in privileged mode with a read/write access (R/W).

These access rights are written, via the corresponding configuration information, in the set of registers RGCS1 assigned to the slave resource IMM1.

Now, if return is made more particularly to FIG. 4, it is seen that in this implementation, there is provided, for example, a register called herein delegation register, associated with each of the memory areas ZM1A, ZM1B and ZM2.

And, these delegation registers RGDC2, RGDC1A, RGDC1B, for example located in the configuration controller RIFC, are intended to contain a bit DCEN, whose logical value will determine whether the management of the access rights of the corresponding memory area can or cannot be delegated to another master equipment.

For illustrative purposes, if the value of this bit is equal to 0, then the management of the access rights cannot be delegated while if the value of this bit is equal to 1, it can be delegated.

Figure 4:
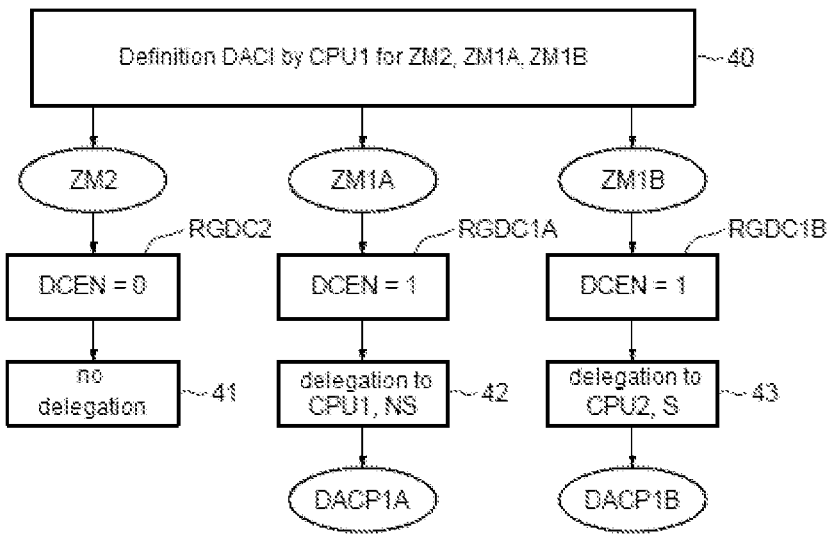
FIG. 4 illustrates a diagram showing the operation of delegation registers according to an embodiment.

In the example of FIG. 4, the register RGDC2 contains the bit DCEN having the logical value 0 while the registers RGDC1A and RGDC1B contain the bit DCEN having the logical value 1. This means that, with regard to the second memory area ZM2, the management of its access rights which were initially assigned to the first master equipment CPU1 for example, cannot, in this configuration example, be delegated to another master equipment (step 41). However, with regard to the first memory area ZM1A, the management of its access rights can be delegated to another master equipment (step 42) for example to the microprocessor CPU1 configured in non-secure mode.

Similarly, with regard to the first memory area ZM1B, the management of its access rights can be delegated (step 43) to the master equipment CPU2 configured in secure mode. Thus, the master equipment CPU1, configured in non-secure mode (NS) can define, for the first memory area ZM1A, particular access rights DACP1A while the master equipment CPU2 configured in secure mode (S) can define, for the memory area ZM1B, access rights DACP1B.

Figure 6:
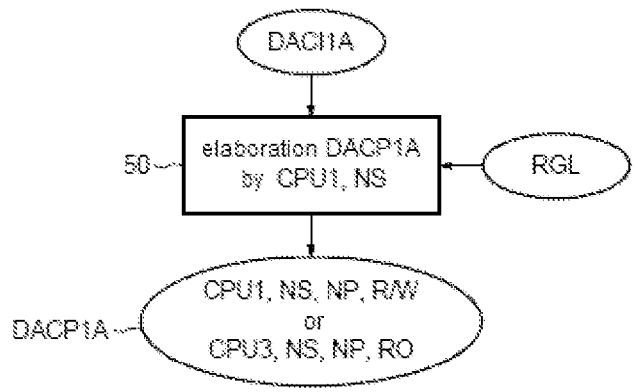

For example, as illustrated in FIG. 6, the elaboration 50 of the particular access rights DACP1A by the master equipment CPU1 configured in non-secure mode, is carried out from the initial access rights DACIA and access right rules RGL.

By way of example, the particular access rights DACP1A can thus provide that the memory area ZM1A can be accessed by the first master equipment CPU1, configured in non-secure mode (NS), in non-privileged mode (NP) with a read/write access (R/W) or else by the master equipment CPU3, configured in non-secured mode (NS), in non-privileged mode (NP) with a read-only access (RO).

As illustrated in FIG. 7 by way of example, the elaboration 60 has particular access rights DACP1B, associated with the memory area ZM1B, by the master equipment CPU2 configured in secure mode (S) is performed from initial access rights DACI1B and rules RGL. The particular access rights DACP1B can thus provide for an access by the master equipment CPU1 configured in secure mode (S), in non-privileged mode (NP) with a read/write access (R/W) or even an access by the master equipment CPU2, configured in secure mode, in non-privileged mode (NP), with a read/write access (R/W).

These different access rights are materialized by the corresponding bits and the identification information of the corresponding master equipment are stored in the set of registers RGCS1 associated with the memory IMM1. And, it is for example the configuration controller RIFC which replaces the initial access rights with particular access rights, in response to a command from the master equipment having received delegation to modify these access rights.

FIG. 8 illustrates an example of rules RGL represented herein in the form of a table. In the left column, are the different secure (S), privileged (P), non-secure (NS) and non-privileged (NP) configurations which can be provided in the initial access rights DACI. The rest of the table indicates for a particular access right DACP whether the S,P or S,NP, or NS,P or NS,NP configuration is authorized or not. If it is authorized, this is materialized by the acronym OK and if it is not authorized it is materialized by the acronym NOK.

In other words, if the initial access rights DACI of a memory area provide for access in secure mode (S) and in non-privileged mode (NP), it will not be possible for the master equipment having received the delegation of modification of access rights, to allocate an access for example in secure (S) and privileged (P) mode. However, it might authorize an access in secure (S) and non-privileged (NP) mode or else an access in non-secure (NS) and non-privileged (NP) mode. Of course, these rules RGL are only a non-limiting example and other examples of rules are possible.

As illustrated schematically in FIG. 9, it is quite possible that the delegation of the management of the access rights by the first master equipment CPU1 for example, to the master equipment CPU2 for example, is only temporary. More particularly, the delegation 70 can for example intervene in the presence of a particular condition CND0, for example the reception of a particular instruction of the user program or else the reception of a control signal without these examples being limiting. This delegation can end, for example, when a condition CND1 is fulfilled, for example the end of the execution of a sub-program or the reception of another control signal, without these examples also being limiting.

In this case, the end of the delegation 71 can result for example in a resumption of the management of the firewall of the memory IMM1 by the first master equipment CPU1 which had initiated the initial access rights.

Figure 10:
FIG. 10 illustrates a diagram showing the content of a transaction according to an embodiment.

Reference is now made more particularly to FIG. 10 to describe an example of the content of a transaction TR.

In general, herein, each transaction TR transmitted by a master equipment includes an addressing field ADR whose content is intended to address the recipient slave resource of this transaction. More specifically, as illustrated in FIG. 10, each transaction TR includes the identification information CID of the master equipment transmitting this transaction, the security information SEC, an indication EXE intended to indicate whether or not this transaction contains an execution instruction, the privilege information PRV, an information RW indicating whether it is a read or write transaction, the addressing field ADR and a data field DATA.

The additional circuits and systems, including for each master equipment EMi, the associated elementary management unit RIMUi which is linked to the corresponding set of configuration registers RGCMi, are configured to add to each transaction transmitted by a master equipment at least the identification information of this master equipment CID. The additional circuits and systems are further configured to add to each transaction transmitted by a master equipment the security information SEC and/or the privilege information if these two information items do not already appear in the transaction transmitted by the master equipment.

The transaction TR is then delivered on the bus linked to the interconnection circuit INTC.

Materially, this elementary management unit RIMUi can comprise a logic circuit.

Figure 11:
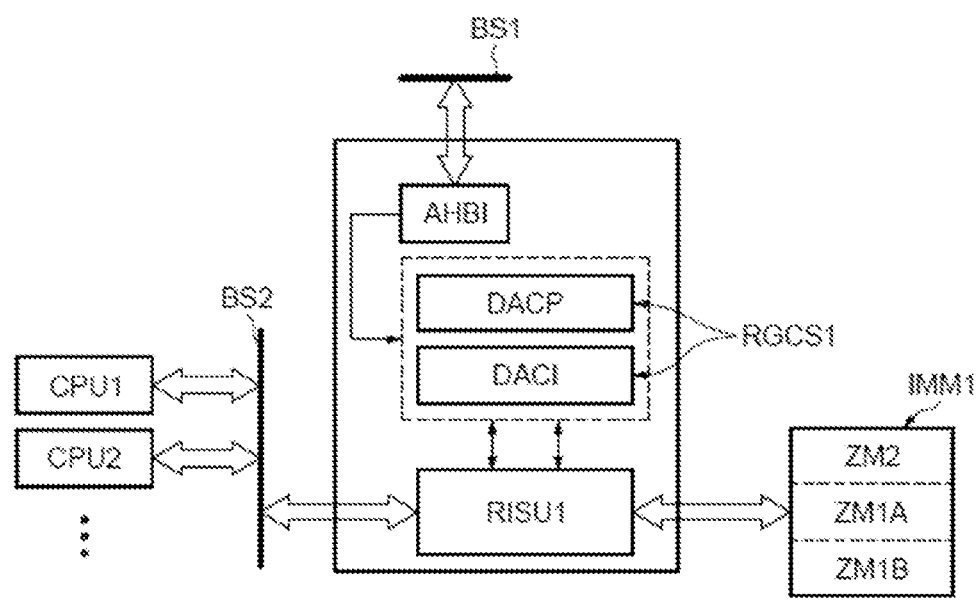
FIG. 11 illustrates a schematic of an embodiment system.

As illustrated schematically in FIG. 11, the elementary check module RISU1 is configured to access the set of configuration information assigned to the slave resource IMM1 stored in the corresponding set of configuration registers RGCS1, and defining for the different memory areas of the memory IMM1, the initial DACI and particular DACP access rights. The update of the registers RGCS1 with the initial access rights DACI and possibly the particular access rights DACP is performed by the configuration controller, via a bus BS1, for example an AHB ("Advanced High performance Bus") type bus, and an AHBI bus interface.

The transactions TR sent by the different master equipment, CPU1, CPU2 . . . are transmitted on the bus BS2 then to the elementary check module RISU1. The latter then checks whether or not the transaction can access the considered memory area of the memory IMM1 depending on the contents of the register RGCS1.

The invention is not limited to the implementations and embodiments which have just been described but encompasses all variants thereof.

Figure 12:
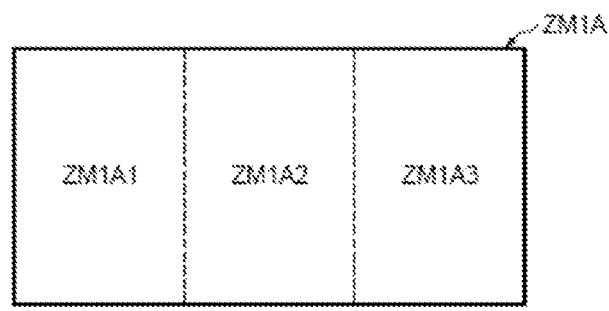
FIG. 12 illustrates a diagram of an embodiment memory partition.

Thus, as illustrated in FIG. 12, the second master equipment which has obtained delegation (herein the equipment CPU1 in non-secured mode) can also partition the first memory area ZM1A into several (herein three) memory sub-areas ZM1A1, ZM1A2, ZM1A3 which are herein disjoint and adjoining. This being the case, these memory sub-areas could be non-adjoining or even overlapping.

The access rights to its memory sub-areas ZM1A1 and ZM1A3 can for example be particular access rights while the memory sub-area ZM1A2 located between the two memory sub-areas ZM1A1 and ZM1A3 assigned specific access rights, can for example retain its initial access rights which had been defined by the first master equipment.

What is claimed is:

1. A system on chip, comprising:
  a plurality of master equipment;
  a plurality of slave resources, wherein at least one slave resource of the plurality of slave resources comprises a memory device including a first memory area;
  an interconnection circuit coupled between the plurality of master equipment and the plurality of slave resources, the interconnection circuit configured to route transactions between the plurality of master equipment and the plurality of slave resources, wherein:
    a first master equipment of the plurality of master equipment is configured to define initial access rights for the first memory area, and to delegate access management of the first memory area to a second master equipment of the plurality of master equipment;
    the second master equipment is configured to define for the first memory area, particular access rights from the initial access rights associated with the first memory area and access right rules, wherein the access right rules define which security and privilege configurations from the initial access rights can be modified by the second master equipment when defining the particular access rights and which security and privilege configurations cannot be modified by the second master equipment, and wherein the access right rules prevent the second master equipment from increasing one or more security levels and one or more privilege levels beyond those established in the initial access rights while permitting the second master equipment to maintain or decrease the one or more security levels and the one or more privilege levels; and
  a check circuit configured to check whether a transaction intended for the first memory area is indeed authorized to access the first memory area using applicable access rights associated with the first memory area, wherein the applicable access rights include the initial access rights, the particular access rights, or other access rights, and the applicable access rights apply when the transaction is received.

2. The system according to claim 1, wherein:
  the first master equipment comprises a first processor; and
  the second master equipment comprises a second processor.

3. The system according to claim 1, wherein:
  the memory device includes a plurality of first memory areas;
  the second master equipment comprises a plurality of second master equipment; and
  the first master equipment is configured to define initial access rights for each first memory area of the plurality of first memory areas, and to delegate access management of the plurality of the first memory areas respectively to the plurality of second master equipment.

4. The system according to claim 1, wherein:
  the first memory area is partitioned into a plurality of memory sub-areas; and
  the second master equipment is configured to allocate respective access rights for the memory sub-areas when the second master equipment obtains delegation for the first memory area from the first master equipment.

5. The system according to claim 1, wherein the first master equipment is further configured to, after delegating the access management of the first memory area to the second master equipment, withdraw the delegation of access management, and resume managing access to the first memory area.

6. The system according to claim 1, wherein:
  the memory device further includes a second memory area; and
  the first master equipment is further configured to define initial access rights for the second memory area.

7. The system according to claim 6, wherein the first master equipment is not authorized to delegate access management to the second memory area.

8. The system according to claim 1, wherein the plurality of master equipment, the plurality of slave resources, the interconnection circuit, and the check circuit are comprised within a microcontroller or a microprocessor.

9. The system according to claim 8, wherein the microcontroller or microprocessor is disposed on a single semiconductor substrate.

10. A method for managing memory access for a system on chip comprising a plurality of master equipment, a plurality of slave resources, an interconnection circuit coupled between the plurality of master equipment and the plurality of slave resources configured to route transactions between the plurality of master equipment and the plurality of slave resources, wherein at least one slave resource of the plurality of slave resources comprises a memory device including a first memory area, the method comprising:
  defining, by a first master equipment of the plurality of master equipment, initial access rights for the first memory area;
  delegating, by the first master equipment, access management of the first memory area to a second master equipment of the plurality of master equipment;
  defining, by the second master equipment for the first memory area, particular access rights from the initial access rights associated with the first memory area and access right rules, wherein the access right rules define which security and privilege configurations from the initial access rights can be modified by the second master equipment when defining the particular access rights and which security and privilege configurations cannot be modified by the second master equipment, and wherein the access right rules prevent the second master equipment from increasing one or more security levels and one or more privilege levels beyond those established in the initial access rights while permitting the second master equipment to maintain or decrease the one or more security levels and the one or more privilege levels; and checking whether a transaction intended for the first memory area is indeed authorized to access the first memory area using applicable access rights associated with the first memory area, wherein the applicable access rights include the initial access rights, the particular access rights, or other access rights, and the applicable access rights apply when the transaction is received.

11. The method according to claim 10, wherein:

the memory device includes a plurality of first memory areas;

the second master equipment comprises a plurality of second master equipment; and the method further comprises:
- defining, by the first master equipment, initial access rights for each first memory area of the plurality of first memory areas, and
- delegating, by the first master equipment, access management of the plurality of the first memory areas respectively to the plurality of second master equipment.

12. The method according to claim 10, further comprising withdrawing, by the first master equipment, the access management of the first memory area from the second master equipment after the first master equipment delegates the access management of the first memory area to the second master equipment.

13. The method according to claim 10, wherein:

the memory device further includes a second memory area; and the method further comprises defining, by the first master equipment, initial access rights for the second memory area.

14. The method according to claim 13, wherein the first master equipment is not authorized to delegate access management to the second memory area.

15. The method according to claim 10, wherein the system on chip forms a microcontroller or a microprocessor.

16. A method of operating a firewall, the method comprising:

receiving, from a first master equipment of a plurality of master equipment, initial access rights for a first memory area of a slave device;

receiving, from the first master equipment, a command to delegate access management of the first memory area to a second master equipment of the plurality of master equipment;

receiving, from the second master equipment, a command to define particular access rights from the initial access rights associated with the first memory area and access right rules for the first memory area, wherein the access right rules define which security and privilege configurations from the initial access rights can be modified by the second master equipment when defining the particular access rights and which security and privilege configurations cannot be modified by the second master equipment, and wherein the access right rules prevent the second master equipment from increasing one or more security levels and one or more privilege levels beyond those established in the initial access rights while permitting the second master equipment to maintain or decrease the one or more security levels and the one or more privilege levels; and checking whether a transaction intended for the first memory area is indeed authorized to access the first memory area using applicable access rights associated with the first memory area, wherein the applicable access rights include the initial access rights, the particular access rights, or other access rights, and the applicable access rights apply when the transaction is received.

17. The method of claim 16, further comprising:

updating a first register set with the initial access rights upon receiving the initial access rights from the first master equipment;

updating a delegation register upon receiving the command to delegate access management from the first master equipment; and updating the first register set with the particular access rights upon receiving the command to define particular access rights from the second master equipment.

18. The method of claim 17, wherein the access right rules define whether the first memory area is defined as secure, non-secure, privileged, or non-privileged to a particular master equipment of the plurality of master equipment.

19. The method of claim 16, further comprising:

receiving, from the first master equipment, initial access rights for a second memory area of the slave device;

receiving, from the first master equipment, a command to delegate access management of the second memory area to the second master equipment;

receiving, from the second master equipment, a command to define particular access rights from the initial access rights associated with the second memory area and access right rules for the second memory area; and checking whether a transaction intended for the second memory area is indeed authorized to access the second memory area using applicable access rights associated with the second memory area, wherein the applicable access rights include the initial access rights, the particular access rights, or other access rights, and the applicable access rights apply when the transaction intended for the second memory area is received.

20. The method of claim 16, wherein the plurality of master equipment and the slave device are disposed on a single chip.

* * * * *